Sept. 30, 1952     J. T. BOWSER     2,612,609
X-RAY FILM HOLDER
Filed March 30, 1951
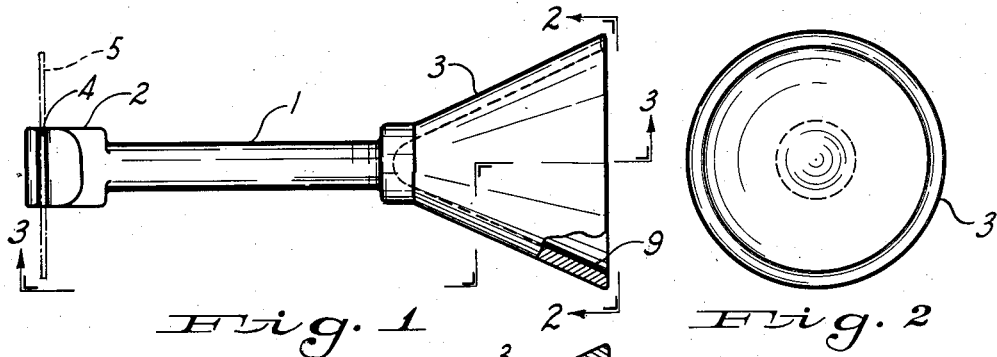
Fig. 1     Fig. 2
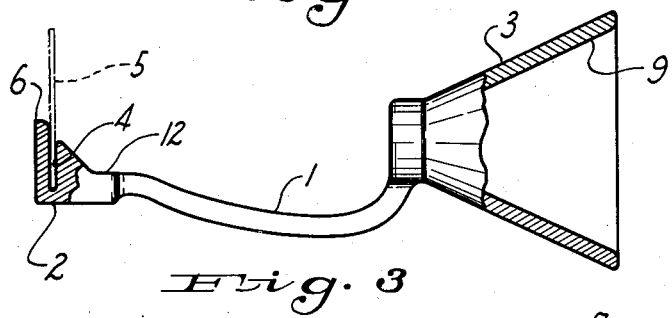
Fig. 3
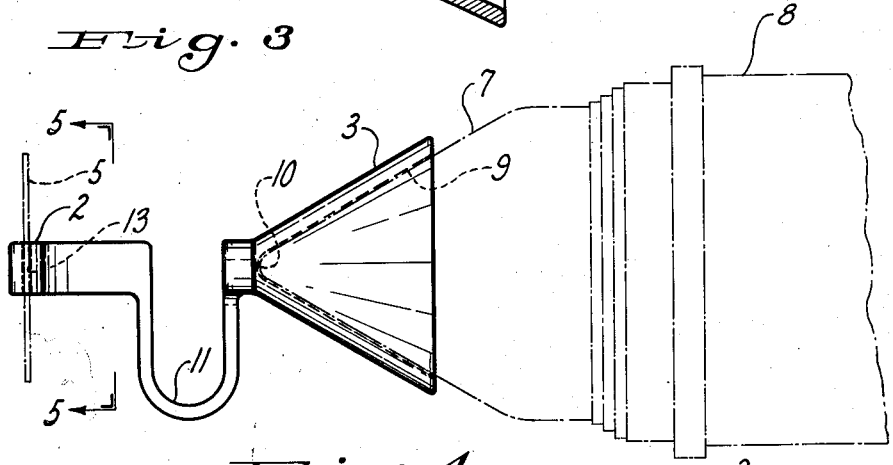
Fig. 4
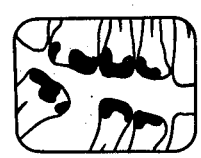 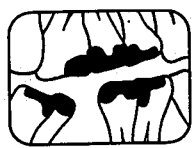 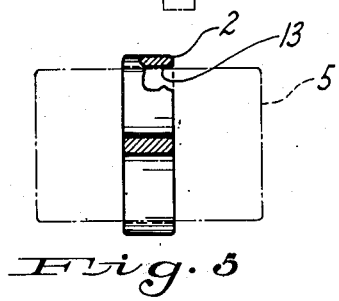
Fig. 6     Fig. 7     Fig. 5
INVENTOR.
Joseph T. Bowser
BY William B. Jaspert
Attorney.

Patented Sept. 30, 1952

2,612,609

UNITED STATES PATENT OFFICE 2,612,609

X-RAY FILM HOLDER

Joseph T. Bowser, Pittsburgh, Pa.

Application March 30, 1951, Serial No. 218,315

1 Claim. (Cl. 250—70)

This invention relates to new and useful improvements in X-ray film holders, more particularly to film holders for use in dental work, and it is among the objects thereof to provide film holders that are provided with a pilot cup for receiving the nose of the X-ray machine, which cup bears a definite relation to the film to at all times obtain an exposure of the teeth being X-rayed which eliminates overlap and provides a sharp accurate negative of the teeth being examined.

It is a further object of the invention to provide a film holder of the above designated character in which the connecting portion between the film holder and the pilot cup is shaped to accommodate the holder to the mouth and to be gripped by the teeth or jaws of the patient to bring and maintain it in proper alignment during the brief interval of the X-ray exposure.

It is still a further object of this invention to provide a film holder of a material that adapts the film holder and pilot cup to be integrally formed without the use of metal, to thereby eliminate interference of exposure of the film to the X-ray, and which permits solid wall construction of the pilot cup.

These and other objects of the invention will become more apparent from a consideration of the accompanying drawing, constituting a part hereof, in which like reference characters designate like parts, and in which—

Fig. 1 is a top plan view of a film holder and pilot cup with the latter partially cut away in section, embodying the principles of this invention;

Fig. 2 an end view taken along the line 2—2, Fig. 1;

Fig. 3 a vertical sectional elevational view taken along the line 3—3, Fig. 1;

Fig. 4 a top plan view of a modified form of film holder and pilot cup illustrating its use with the hose of an X-ray machine;

Fig. 5 a cross-sectional view taken along the line 5—5, Fig. 4;

Fig. 6 a view in front elevation of an X-ray negative illustrating the proper exposure of the teeth when produced by the use of the film holder illustrated in Figs. 1 to 5, inclusive; and Fig. 7 a similar view of improperly exposed teeth which are overlapped because of misalignment of the film with the X-ray.

With reference to Figs. 1 to 5, inclusive, of the drawing, the numeral 1 designates a bar having a film holder bracket 2 and a pilot cup 3 integrally formed therewith, the entire structure being preferably formed of a plastic material which may be readily molded to shape and is non-interfering with the X-ray directed to the film placed in the holder.

As shown in Figs. 1 and 3, the film holder bracket is provided with a slot 4 for receiving the film or plate 5, the slot being close fitting to provide gripping engagement of the film plate. The construction of the bracket 2 allows a slight flexing of the end portion 6 of the bracket to permit insertion of the film plate 5 in the slot 5 for gripping engagement.

As shown in Fig. 4, the pilot cup 3 is shaped to receive the nose 7 of the tube 8 of an X-ray machine, the funnel-like interior 9 of the cup 3 being complementary to the surface contour of the nose 7. It will be noted that because of the use of a material such as a synthetic resin, which is non-interfering with the free transmission of the X-ray, the cup 3 is closed at the bottom 10 so that the nose 7 may be guided into proper position without any difficulty. The film holder bracket 2 is in alignment with the axis of the nose 7, with the slot 13 at right angles to the axis of the X-ray. Consequently there can be no misalignment, which results in a sharp negative as shown in Fig. 6. If, for example, the beam of the X-ray were at an angle other than at right angles to the plate 5, there would be an overlap of the teeth as shown in Fig. 7 of the drawing.

The bar 1 connecting the film holder with the pilot cup may be of any shape suitable for placement of the film holder in the proper position in the mouth of the patient, the form of the bar 1 shown in Figs. 1 and 3 being almost straight to adapt it for use in X-raying the front teeth of a patient. With the U-shaped bar 11 shown in Fig. 4, the film holder may be inserted in the mouth to X-ray the side teeth, the U-shaped clearance permitting the cheek to clear the bar when it is inserted in the mouth of the patient. As shown in Figs. 1 and 3, the film holder bracket 2 may be provided with a ledge 12 on which the teeth are closed to hold the film holder in position, which eliminates the necessity of holding the plate or holder in the mouth as in conventional practice.

In the form of film holder shown in Figs. 4 and 5, the open slot 4 is eliminated and a loop-shaped holder is provided which has a slotted opening 13 for receiving the film 5.

In the use of the above-described dental film holder, the film is inserted in the slot 4 or in the slotted opening 13 in the manner shown in Figs. 3 and 5, respectively. The film holder is then inserted in the mouth of the patient with the film in proper alignment to the teeth to be exposed.

When this is done the pilot cup 3 is automatically alinged with the film so that when the nose 7 of the X-ray machine is inserted in the pilot cup the X-ray will be in right angle alignment with the plane of the film, resulting in a sharp non-overlapping exposure as shown in Fig. 6. It is a simple matter for even an unskilled technician to make proper and reliable exposures of teeth to be examined because the film holder properly aligns the negative material with the teeth while the pilot cup provides proper and accurate alignment of the X-ray machine nose with the film. The above described film holder is of great advantage in modern dental practice as it eliminates the frequent retaking of X-ray exposures due to misalignment and overlaps, and because it eliminates the unsanitary practice of inserting a finger or thumb in the mouth to hold the film.

One of the advantages of the above-described combined film holder and X-ray pilot cup is that the rigidity of the structure prevents distortion and destruction of the film as would result in the use of more flexible devices such as are in conventional use. This is particularly true of the structure shown in Fig. 4 of the drawing which is employed in taking bite-wing X-rays, such as shown in Fig. 6 of the drawing, where it is difficult to locate the film with respect to the X-ray machine. It has been found that by the use of the device shown in Fig. 4, good X-rays may be obtained in the case of extremely young children, who have a tendency to chew any object that is placed in the mouth.

Also, due to the appliance being rigid, after the patient has locked his teeth on the bite block and the cone of the X-ray machine is placed in the pilot cup, the operator can leave the patient and operate the X-ray machine from any place in the office, so that the operator will not be in the path of the X-rays at any time during the exposure.

Although several embodiments in the invention have been herein illustrated and described, it will be evident to those skilled in the art that various modifications may be made in the details of construction without departing from the principles herein set forth.

I claim:

A dental film holder for holding X-ray films comprising a non-metallic bar having an integrally formed bracket at one end thereof and a pilot cone at the other end integral therewith, said bar having an intermediate ledge portion shaped to be gripped by a patient's teeth, means for securing a film to said film holder comprising a slotted portion in the bracket end thereof adapted to receive and tightly engage an edge portion of said film, a conical recess forming a part of said pilot cone complementary to the shape of the nose of an X-ray machine tube and adapted to receive the nose of said tube, said bar securing said slotted bracket and pilot cone with respect to each other and in such spaced relation that the axis of the nose of said X-ray tube and conical recess of said pilot cone are at right angles to the plane of a surface of said film whereby said dental film holder when held between the teeth of a patient secures said film and nose of the X-ray machine tube with respect to each other and the patient's teeth in effective focally spaced relation.

JOSEPH T. BOWSER.

REFERENCES CITED

The following references are of record in the file of this patent:

UNITED STATES PATENTS

| Number | Name | Date |
| --- | --- | --- |
| 2,034,049 | Levy | Mar. 17, 1936 |
| 2,090,933 | Bolin | Aug. 24, 1937 |
| 2,553,028 | Wright | May 15, 1951 |

FOREIGN PATENTS

| Number | Country | Date |
| --- | --- | --- |
| 257,575 | Switzerland | Apr. 1, 1949 |